(12) United States Patent
Nicolini

(10) Patent No.: US 7,779,861 B2
(45) Date of Patent: Aug. 24, 2010

(54) DEVICE FOR ADJUSTING THE FLOW-RATE OF A FLUID, PARTICULARLY MEDICAL OXYGEN AND COMPRESSED GASES IN GENERAL

(75) Inventor: Giancarlo Nicolini, Villanuova Sul Clisi (IT)

(73) Assignee: Pergola S.R.L., Calcinato (IT)

( * ) Notice: Subject to any disclaimer, the term of this patent is extended or adjusted under 35 U.S.C. 154(b) by 442 days.

(21) Appl. No.: 11/898,087

(22) Filed: Sep. 10, 2007

(65) Prior Publication Data
US 2008/0066818 A1   Mar. 20, 2008

(30) Foreign Application Priority Data
Sep. 18, 2006  (EP)  .................... 06425643

(51) Int. Cl.
*F16K 35/00*   (2006.01)
(52) U.S. Cl. .................. 137/559; 251/97; 251/206; 251/208; 251/227
(58) Field of Classification Search .......... 251/205–209, 251/96, 97, 215, 226, 227; 137/559
See application file for complete search history.

(56) References Cited

U.S. PATENT DOCUMENTS

| 2,101,356 A | * | 12/1937 | Zak .............................. 251/96 |
| 2,723,102 A | * | 11/1955 | Mueller ......................... 251/96 |
| 3,949,966 A | * | 4/1976 | Fabish ........................ 251/206 |
| 4,148,460 A | * | 4/1979 | Kinsler ....................... 251/206 |
| 4,241,896 A | * | 12/1980 | Voege ......................... 251/206 |
| 4,328,832 A |   | 5/1982 | Inada et al. |
| 4,718,638 A |   | 1/1988 | Phlipot et al. |
| 4,909,476 A | * | 3/1990 | Messick ...................... 251/206 |
| 5,246,201 A | * | 9/1993 | Messick ...................... 251/208 |
| 5,640,997 A |   | 6/1997 | Reed et al. |
| 6,026,854 A | * | 2/2000 | Davidson ..................... 251/206 |
| 6,053,055 A | * | 4/2000 | Nelson ........................ 251/205 |
| 6,962,167 B2 |   | 11/2005 | Rogalski et al. |
| 2005/0247901 A1 |   | 11/2005 | Wang |

* cited by examiner

*Primary Examiner*—John Bastianelli
(74) *Attorney, Agent, or Firm*—Modiano & Associati; Albert Josif; Daniel J. O'Byrne

(57) ABSTRACT

A device for adjusting the flow-rate of a fluid, particularly medical oxygen and compressed gases in general, which comprises a valve body which defines an input duct for a low-pressure fluid which is connected to a rotary flow control element, which has an output port which can be arranged at the calibrated holes of a flow-rate adjustment disk; the calibrated holes are connected to an output duct; an actuation handwheel is also provided which is functionally associated with the rotary flow control element; the actuation handwheel comprises means for positioning the flow control element so that the output port is arranged at at least one of the calibrated holes.

9 Claims, 3 Drawing Sheets

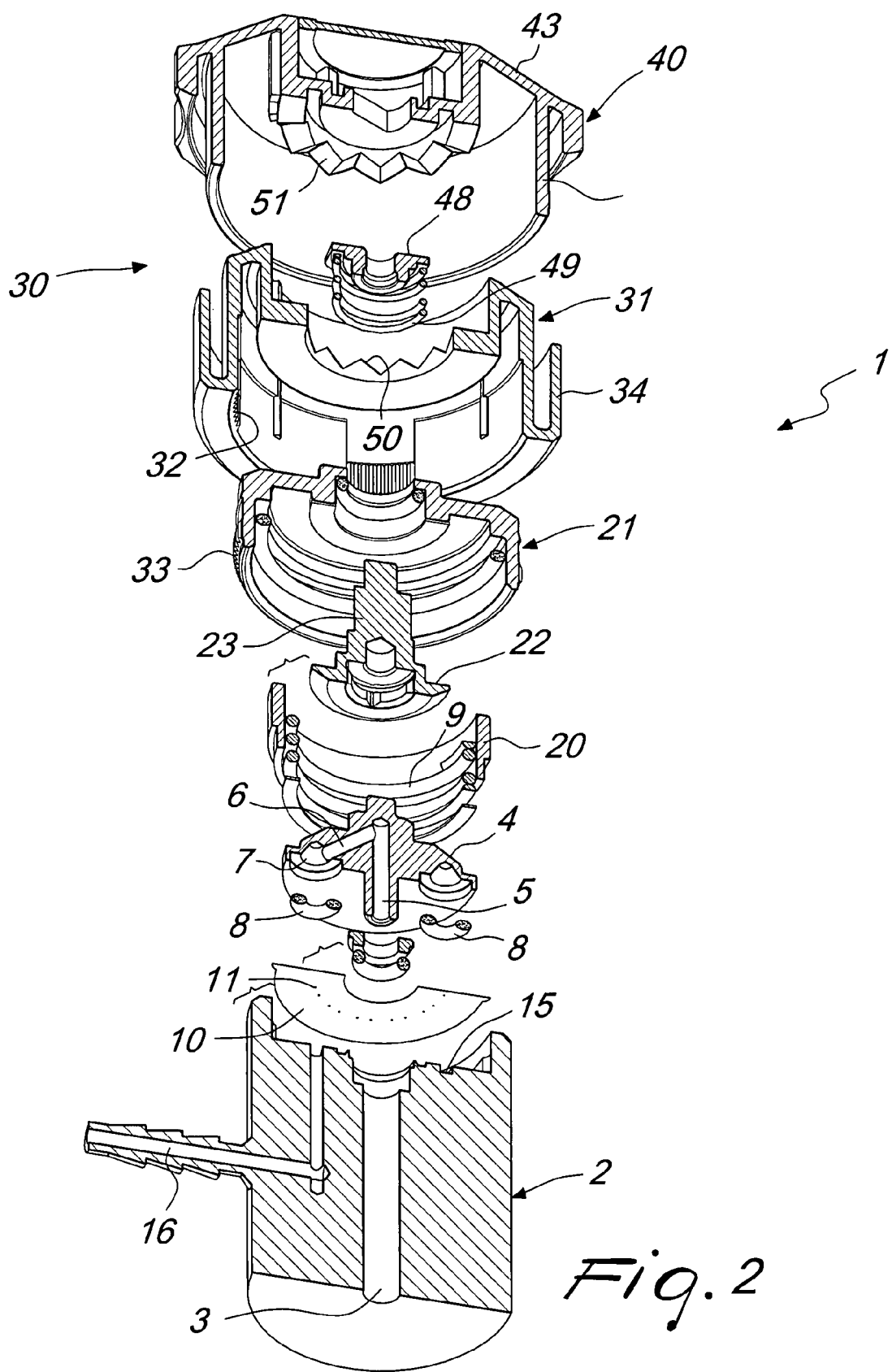

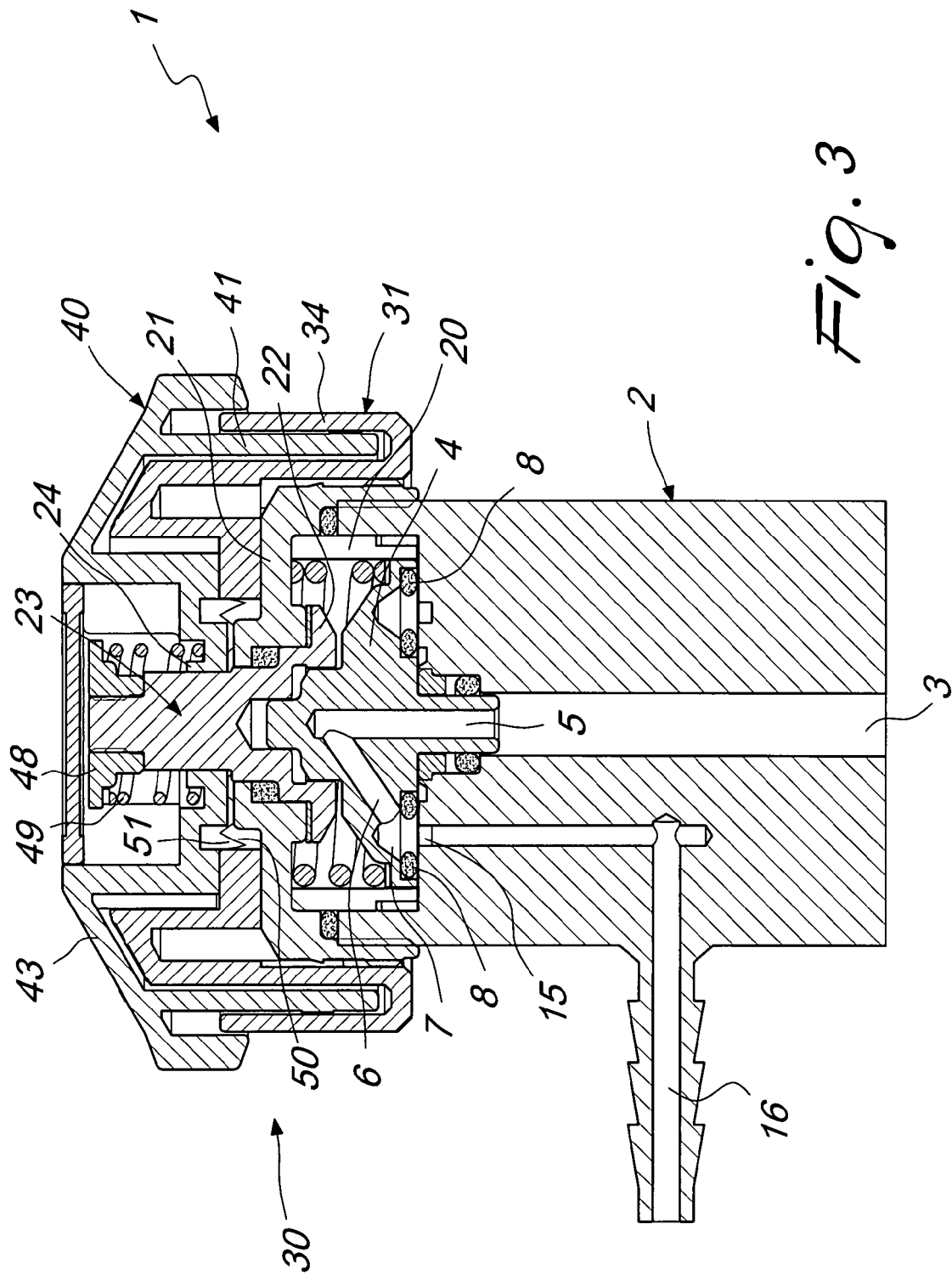

DEVICE FOR ADJUSTING THE FLOW-RATE OF A FLUID, PARTICULARLY MEDICAL OXYGEN AND COMPRESSED GASES IN GENERAL

The present invention relates to a device for adjusting the flow-rate of a fluid, particularly medical oxygen and compressed gases in general.

BACKGROUND OF THE INVENTION

As is known, in order to dispense different gases and particularly medical oxygen it is necessary to provide a device which allows to adjust the flow-rate of the fluid that is dispensed.

The solutions of the background art generally provide rotating disks which are polygonally coupled to a rotating rod, connected to a handwheel which allows to turn the disk so as to place at least one of the provided calibrated holes at a product delivery port.

Such known solutions suffer problems of deformation and crushing of the disk during rotation; moreover, with known solutions the rotating disk may arrange itself so that no holes are located at the output port and therefore the output flow may even be interrupted, with the consequent severe problems, in view also of the fact that the user might be a patient who is alone and is suffering a respiratory crisis.

SUMMARY OF THE INVENTION

The aim of the invention is to solve the problems described above by providing a device for adjusting the flow-rate of a fluid, particularly medical oxygen, which allows to provide extremely precise calibrated holes without running the risk of damaging the disk in which the holes are provided.

Within this aim, a particular object of the invention is to provide a device in which there is always the certainty of having a transit flow of gas, preventing the risk of accidental interruptions of the oxygen flow.

Another object of the present invention is to provide a device which thanks to its particular constructive characteristics is capable of giving the greatest assurances of reliability and safety in use.

Still another object of the present invention is to provide a device which can be obtained easily starting from commonly commercially available elements and materials and is further competitive from a merely economical standpoint.

This aim and these and other objects which will become better apparent hereinafter are achieved by a device for adjusting the flow-rate of a fluid, particularly medical oxygen, according to the invention, comprising a valve body which defines an input duct for a low-pressure fluid which is connected to a rotary flow control element, which defines an output port which can be arranged at the calibrated holes of a flow-rate adjustment disk, said calibrated holes being connected to at least one output duct, an actuation handwheel being further provided which is functionally associated with said rotary flow control element, characterized in that it comprises, in said actuation handwheel, means for stably positioning said flow control element so that said output port is arranged at at least one of said calibrated holes.

BRIEF DESCRIPTION OF THE DRAWINGS

Further characteristics and advantages will become better apparent from the description of a preferred but not exclusive embodiment of a device for adjusting the flow-rate of a fluid, particularly medical oxygen, illustrated by way of non-limiting example in the accompanying drawings, wherein:

FIG. 2 is an exploded sectional perspective view of the device;

FIG. 3 is a sectional view of the device, taken along a diametrical plane;

DESCRIPTION OF THE PREFERRED EMBODIMENTS

Figure 1:
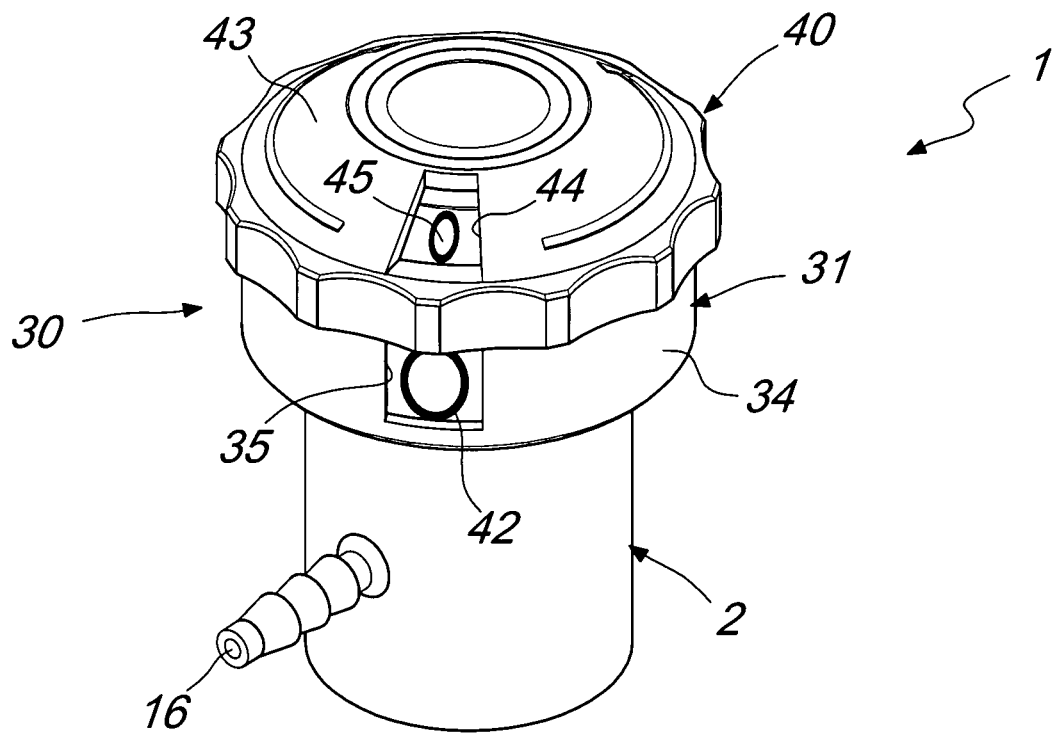
FIG. 1 is a schematic perspective view of the flow-rate adjustment device according to the invention.
Figure 4:
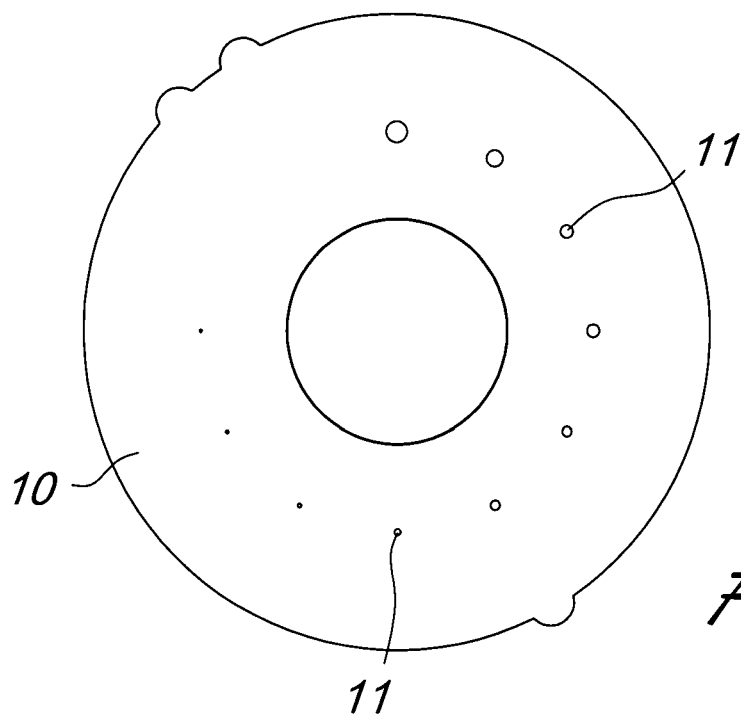
FIG. 4 is a plan view of the flow-rate adjustment disk.

With reference to the figures, the device for adjusting the flow-rate of a fluid, particularly medical oxygen, generally designated by the reference numeral 1, comprises a valve body 2, which defines an input duct 3 which is connected to a device for delivering a low-pressure fluid, generally oxygen.

At the end of the input duct 3 there is a rotary flow control element 4, which defines an axial duct 5 on the continuation of the duct 3, which is connected to a branch duct 6 which ends with an output port 7 where a sealing O-ring 8 is arranged.

The output port can be arranged at the surface of a flow-rate adjustment disk, designated by the reference numeral 10, which has a low thickness, lower than one tenth of a millimeter, and is provided circumferentially with a uniformly distributed plurality of calibrated holes 11.

Other O-rings, in addition to the O-ring 8, can be provided on the rotating body, on which a compression spring 9 acts, and merely have a balancing function.

The disk 10, which is fixed, is applied at an upper abutment surface of the valve body 2 and has a low thickness, substantially one tenth of a millimeter, so that it is possible to provide extremely precise calibrated holes by means of a laser beam.

The calibrated holes 11 are arranged at a connecting duct 15, which is arranged so as to correspond to the extension of the calibrated holes and is connected to an output duct 16 for dispensing the gas whose flow-rate is to be adjusted; of course, nothing changes if the direction of flow is reversed.

The disk 10 is kept in position by means of a perimetric spacer 20, which is clamped by means of a cap 21 arranged at the upper portion of the valve body.

The cap 21 engages a flange 22 of a shaft 23 which is provided with a polygonal portion 24 for rigid rotational engagement with an actuation handwheel, generally designated by the reference numeral 30.

The actuation handwheel has the particularity that it is constituted by a fixed lower portion 31, which is provided with a male set of teeth 32 which engages a corresponding female set of teeth 33 provided by the cap 21 so as to define a preset axial arrangement.

The lower portion 31 defines an outer border 34, which is provided with a viewport 35, through which it is possible to view an indicator arranged on the lateral surface of the movable upper portion 40 of the handwheel, which has a side wall 41 which is arranged circumferentially below the outer border 34 and has indications 42 which can be viewed from the viewport 35.

The upper portion 40 further has a frustum-shaped connecting portion 43, which is provided with a movable window 44 for viewing a fixed indicator 45 provided on the fixed portion 31, thus allowing to have an indication of the flow-rate which is visible both at the lateral surface and at the upper surface.

The knob 30 is kept in position by means of a ring 48, which engages the shaft 23 and acts on a pusher spring 49 which pushes the movable portion 40 against the fixed lower portion 31 of the actuation handwheel.

The peculiar characteristic consists in that means for stably positioning the flow control element are provided in the actuation handwheel so as to position the output port 7 always at at least one of the calibrated holes 11.

Such means are constituted by a fixed front set of teeth 50 provided on the lower portion 31 and by a movable front set of teeth 51 provided on the portion 40, which provide a precise mating, preventing the movable upper portion, which is connected to the flow control element 4, from being able to stop in a position in which the port 7 is not arranged at a hole 11.

The movable upper portion can rotate and perform an axial translational motion in contrast with the action of the pusher spring 49 with respect to the fixed portion, thus allowing to achieve easy and safe adjustment together with the possibility of maximum safety, which prevents unstable arrangements in which interruptions of flow would occur.

The calibrated holes lie substantially along the entire circumference and there is a portion in which the flow is interrupted, said region being indicated by the zero indicators that appear in the various windows.

From what has been described above it is therefore evident that the invention achieves the proposed aim and objects, and in particular the fact is stressed that the particular structure used, which allows to use a disk with calibrated holes and fixed positioning, allows to achieve maximum machining precision without subjecting such disk to stresses which might damage it.

Moreover, the particular means used prevent the arrangement of the flow control element in positions which prevent the dispensing of the flow, except for the region preset for the initial portion with zero flow-rate.

The invention thus conceived is susceptible of numerous modifications and variations, all of which are within the scope of the inventive concept.

All the details may further be replaced with other technically equivalent elements.

In practice, the materials used, as well as the contingent shapes and dimensions, may be any according to requirements.

The disclosures in EPA No. 06425643.1 from which this application claims priority are incorporated herein by reference.

What is claimed is:

1. A device for adjusting the flow-rate of a fluid, comprising a valve body which defines an input duct for a low-pressure fluid which is connected to a rotary flow control element, which defines an output port which can be arranged at the calibrated holes of a flow-rate adjustment disk, said calibrated holes being connected to at least one output duct, an actuation handwheel being further provided which is functionally associated with said rotary flow control element, comprising, in said actuation handwheel, means for stably positioning said flow control element so that said output port is arranged at least one of said calibrated holes, said actuation handwheel comprising a fixed lower portion and a rotary upper movable portion which can move axially with respect to said fixed lower portion, and said stable positioning means comprise a fixed front set of teeth which is defined by said fixed lower portion which can be coupled detachably to a movable front set of teeth formed in said upper portion.

2. The device according to claim 1, wherein said adjustment disk is arranged in a fixed position.

3. The device according to claim 1, wherein said adjustment disk has a thickness which is substantially lower than one tenth of a millimeter.

4. The device according to claim 1, further comprising a perimetric spacer which can be clamped by means of a cap which is associated with an upper portion of said valve body.

5. The device according to claim 4, further comprising a shaft which is rotatably associated with said valve body and is kept in position by a flange which can engage said cap, said shaft having a polygonal portion for monolithic rotary engagement with said actuation handwheel.

6. The device according to claim 1, wherein said fixed lower portion has a male set of teeth, which can engage a corresponding female set of teeth which is provided in said cap in order to define a preset circumferential position.

7. The device according to claim 1, wherein said fixed lower portion has an outer border provided with a viewport for viewing an indicator arranged on a lateral surface of said movable upper portion.

8. The device according to claim 1, wherein said movable upper portion has a connecting portion which defines a movable window for viewing a fixed indicator formed by said fixed lower portion.

9. The device according to claim 1, wherein said movable upper portion is kept in position by means of a ring which engages said shaft and acts on a pusher spring in order to push said movable upper portion against said fixed lower portion.

* * * * *